(12) United States Patent
Ohara et al.

(10) Patent No.: US 6,216,757 B1
(45) Date of Patent: Apr. 17, 2001

(54) LOW NOISE LEVEL TIRE

(75) Inventors: Masashi Ohara, Niiza; Eiji Takiguchi, Higashiyamato, both of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 08/320,781

(22) Filed: Oct. 11, 1994

Related U.S. Application Data

(63) Continuation of application No. 07/978,413, filed on Nov. 18, 1992, now abandoned.

(30) Foreign Application Priority Data

Nov. 18, 1991 (JP) .................................... 3-301829

(51) Int. Cl.⁷ ................. B60C 1/00; B60C 11/00
(52) U.S. Cl. ....................... 152/209.7; 152/532
(58) Field of Search ................ 152/209 R, 209 D, 152/532, 209.5, 209.7

(56) References Cited

U.S. PATENT DOCUMENTS

| | | | |
|---|---|---|---|
| 4,349,061 | * 9/1982 | Hirakawa et al. | ............... 152/532 |
| 4,381,810 | * 5/1983 | Cody et al. | ............... 152/209 R |
| 5,046,542 | 9/1991 | Ohta et al. | . |
| 5,109,902 | * 5/1992 | Kobayashi | ............... 152/209 R |

FOREIGN PATENT DOCUMENTS

| | | | |
|---|---|---|---|
| 0161793 | 11/1985 | (EP) . | |
| 0301138 | 2/1989 | (EP) . | |
| 0370724 | 5/1990 | (EP) . | |
| 2150509 | 7/1985 | (GB) . | |
| 0116506 | * 6/1985 | (JP) | ............... 152/209 R |
| 0283001 | * 12/1987 | (JP) | ............... 152/209 R |
| 6390402 | * 4/1988 | (JP) | ............... 152/209 R |
| 0040405 | * 10/1988 | (JP) | ............... 152/209 R |

OTHER PUBLICATIONS

European Search Report dated Feb. 19, 1993.
Patent Abstracts of Japan, vol. 011, No. 074 (M–568) Mar. 6, 1987 & JP–A–61 229 602 (Ohtsu Tire & Rubber Co., Ltd.) Oct. 13, 1986.
Patent Abstracts of Japan, vol. 9, No. 132 (M–385)(1855) Jun. 7, 1985 & JP–A–60 015 203 (Bridgestone K.K.) 25.

* cited by examiner

*Primary Examiner*—Steven D. Maki
(74) *Attorney, Agent, or Firm*—Sughrue, Mion, Zinn, Macpeak & Seas, PLLC

(57) ABSTRACT

A low noise level tire includes a carcass composed of at least one ply toroidally extending between a pair of bead cores, and a tread arranged radially outwardly of the carcass and composed of an outer cap rubber layer and an inner base rubber layer. The cap rubber layer is made of a rubber having a dynamic storage modulus of not less than $1.0 \times 10^8$ dyn/cm² and not more than $2.0 \times 10^8$ dyn/cm² and a loss tangent more than 0.15 and not more than 0.35. The base rubber layer is made of a rubber having a dynamic storage modulus of not less than $1.2 \times 10^8$ dyn/cm² and not more than $2.2 \times 10^8$ dyn/cm² and a rate of foaming of not less than 5% and not more than 50%.

8 Claims, 1 Drawing Sheet

FIG_1
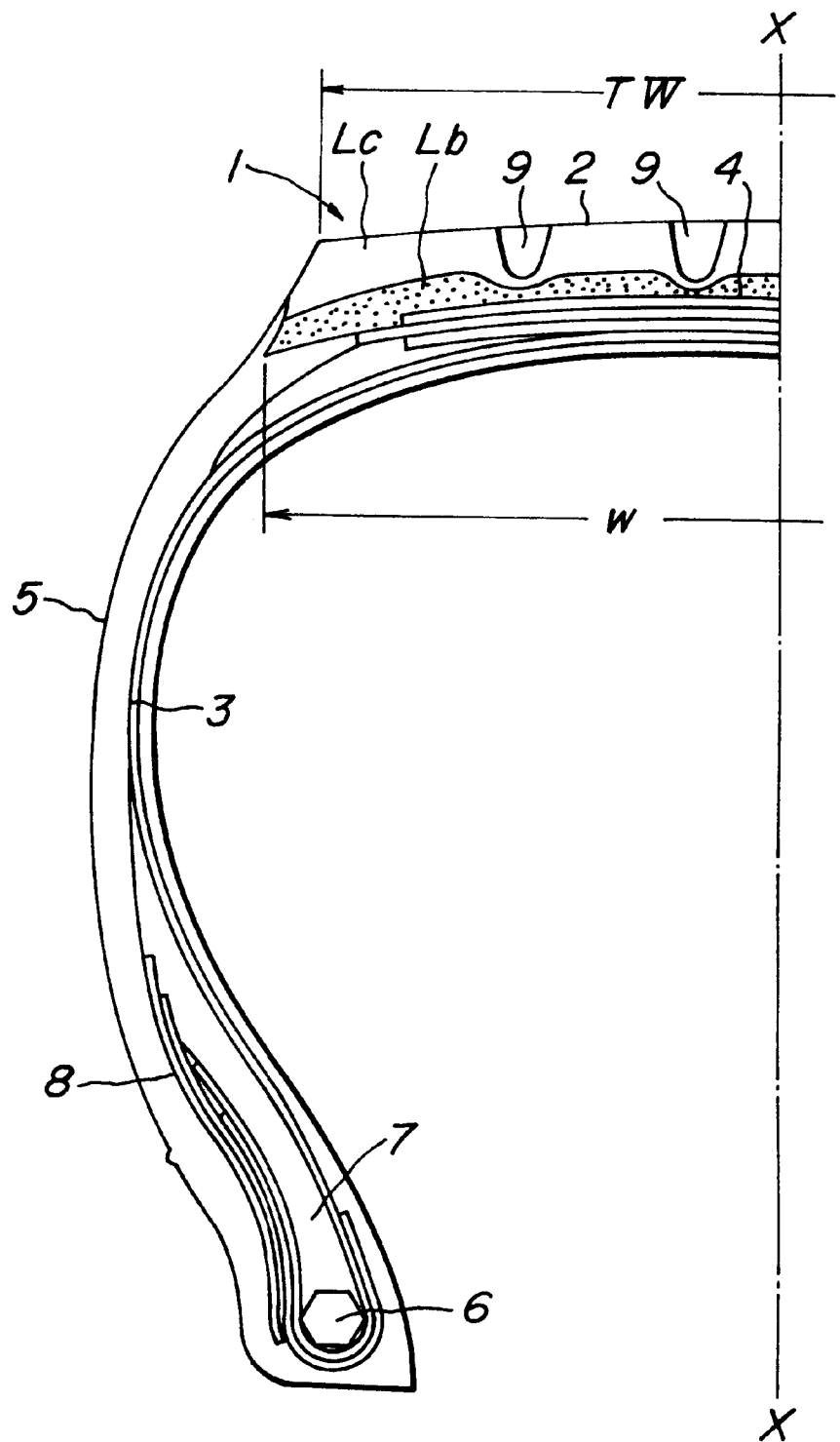

LOW NOISE LEVEL TIRE

This is a Continuation of application Ser. No. 07/978,413 filed Nov. 18, 1992 now abandoned.

BACKGROUND OF THE INVENTION (1) Field of the Invention

The present invention relates to tires for use in general vehicles, particularly trucks, buses and modern urban traffic vehicles such as monorail cars, subway trains using rubber tires and the like. More particularly, the invention relates to a low noise level tire which lowers both passing noises and acceleration noises generated from the tire to reduce vehicle-outside noise including the noises of these types, and simultaneously maintains its wear-resistance as an essential performance at a high level as desired.

(2) Related Art Statement

Recently, great interest has risen in the noise dispersed from vehicles among various factors of tires affecting the social environment, and demand for the reduction of the noise generated from the tires themselves has been increasing, in addition to the economical improvement of tires, which is a fundamental requirement. Such demand for the reduction of noise has risen with respect to not only tires for cars running on general roads but also tires for monorail cars, subway trains and other modern urban traffic vehicles.

In the past, noise generated from the tire to the outside of a test vehicle (vehicle-outside noise) was usually measured in a state where the vehicle was drifted after a clutch in the vehicle had been disengaged. A microphone was fixedly arranged at a position spaced 7.5 m from a running way of the tire to be tested, and the noise was measured when the vehicle passed by the position. The magnitude of the passing noise was judged by the measured results. However, since it is considered that the passing noise is not sufficient to represent the actual vehicle noise, a conclusion has been reached that a combination of the acceleration noise and the passing noise must be considered with the same importance for estimating the actual vehicle noise.

In order to lower the passing noise in the reduction of the tire noise, it has been proposed to modify grooves formed in treads or to change the configuration of treads.

Moreover, for example, Japanese Patent Application Laid-open No. 2-225106 disclosed a tire whose tread is composed of a usual cap rubber layer and a base layer made of a foam rubber having a low elastic modulus and a high loss tangent in order to maintain wear-resistance and improve the riding comfortability against vibration, although it does not aim to directly reduce the vehicle-outside noise.

Furthermore, Japanese Patent Application Laid-open No. 2-60803 disclosed a tire adapted to reduce the noise in a vehicle caused by vibration when running on a bad road without lowering the cornering performance, although it does not aim to directly reduce the vehicle-outside noise, either. The disclosed tire has a tread including a cap layer and an inner layer. The cap layer is made of a usual rubber having a high hardness and a high elastic modulus, and the inner layer is made of the same rubber as that of the cap layer but mixed with 3% to 10% by volume of a vulcanized rubber particles having a low hardness to have a low elastic modulus and a low loss tangent.

Among the proposals described above, with the modified grooves in the treads or the modified treads themselves, the wear-resistance is unavoidably lowered and further reduction in acceleration noise is scarcely possible because no attention is paid to the reduction in the acceleration noise, although the passing noise can be reduced.

The techniques disclosed in Japanese Patent Application Laid-open Nos. 2-225106 and 2-60803 have suggested the reduction in the vehicle-outside noise. However, with the tire disclosed in the Japanese Patent Application Laid-open No. 2-225106, the acceleration noise is rather increased according to results of experiments carried out by the present inventors, although both wear-resistance and the riding comfortability against vibration can be simultaneously improved and the passing noise can be lowered, the acceleration noise inversely becomes greater.

Moreover, with the tire disclosed in Japanese Patent Application Laid-open No. 2-60803, the passing noise greatly increases with respect to the vehicle-outside noise, although the acceleration noise can be reduced.

By way of experiment, tires were produced whose cap layer of the tread was made of a rubber having a low elastic modulus and a high loss tangent within a range guessed at from the disclosures of the above two Japanese Applications, and these tires were tested. As a result, the passing and acceleration noises were reduced, but the wear-resistance was lowered to an extent that the tires could not be practically used.

In measuring the passing and acceleration noise in the present invention, a microphone is arranged adjacent a tire so as to measure only the noise generated from the tire in order to exclude the influence of background noise as much as possible. This is different from the conventional measurement made by arranging a microphone at a position remote from the vehicle as described above.

From the above explanation, it is concluded that there is no prior art technique which can reduce the passing and acceleration noise simultaneously without lowering the wear-resistance of a tire.

SUMMARY OF THE INVENTION

It is an object of the invention to provide a low noise level tire capable of maintaining grooves and the shape of a tread in best configurations without modification of them, which tread grooves and shape greatly affect performance of the tire, such as wear-resistance, simultaneously reducing both the passing and acceleration noises which have been incompatible with each other as in the prior art described above because one of them is decreased to in turn increase the other, and further preventing the great reduction in wear-resistance which tends to occur when both the passing and acceleration noise are simultaneously reduced.

In other words, the object of the invention is to provide a low noise level tire which can maintain or improve wear-resistance which is fundamentally essential for the tire, and can simultaneously reduce both the passing and acceleration noises dB (A) which have been increasingly demanded to be lowered recently. Namely, the object of the invention is to provide a tire having the above effects without modifying the skeleton and the construction of the tire.

In order to accomplish the object, the present invention is to provide a low noise level tire including a carcass of at least one ply toroidally extending between a pair of bead cores, and a tread arranged radially outwardly of the carcass and composed of an outer cap rubber layer and an inner base rubber layer, wherein the cap layer is made of a rubber having a dynamic storage modulus of not less than $1.0 \times 10^8$ dyn/cm$^2$ and not more than $2.0 \times 10^8$ dyn/cm$^2$ and a loss tangent of not less than 0.15 and not more than 0.35, and the base layer is made of a rubber having a dynamic storage modulus of not less than $1.2 \times 10^8$ dyn/cm$^2$ and not more than $2.2 \times 10^8$ dyn/cm$^2$ and a rate of foaming more than 5% and less than 50%.

In the present invention, the maximum width of the base layer in its axial width direction is preferably at least equal to the entire width of the tread of the tire.

The low noise level tire having the above features according to the invention can improve or maintain the wear-resistance at high level, which is essential for any tire, and can simultaneously lower both the passing and acceleration noise to desired levels, which could not be achieved in the prior art.

In order that the invention may be more clearly understood, preferred embodiments will be described, by way of example, with reference to the accompanying drawings.

BRIEF DESCRIPTION OF THE DRAWINGS

For a better understanding of the invention, reference is made to the attached drawing:

FIG. 1 is a sectional view illustrating a half portion of a tire according to the invention on the left side of an equatorial plane taken along a radial plane including a rotating axis of the tire.

DESCRIPTION OF THE PREFERRED EMBODIMENTS

One embodiment of the low noise level tire according to the invention is shown in FIG. 1 which illustrates a half portion of the tire on the left side of an equatorial plane X—X in section taken along a radial plane including the rotating axis of the tire. The low noise level tire 1 includes a tread 2, which is composed of a base rubber layer Lb and a cap rubber layer Lc. The tread has a tread width TW. A radial carcass 3 toroidally extends between a pair of bead cores 6, which are each reinforced by a stiffener rubber 7 and a chafer 8. A side rubber 5 extends between the bead portions and the tread 2. The tread 2 is formed with circumferential grooves 9.

The rubber of the cap layer Lc has a dynamic storage modulus (E'c) of not less than $1.0 \times 10^8$ dyn/cm$^2$ and not more than $2.0 \times 10^8$ dyn/cm$^2$ and a loss tangent (tan $\delta$c) of not less than 0.15 and not more than 0.35. On the other hand, the rubber of the base layer Lb has a dynamic storage modulus (E'b) of not less than $1.2 \times 10^8$ dyn/cm$^2$ and not more than $2.2 \times 10^8$ dyn/cm$^2$. The above values of the dynamic storage modulus and the loss tangent are values determined by measuring using a viscoelastic spectrometer under the conditions: atmospheric temperature of 25° C., frequency of 52 Hz, initial strain of 5% and dynamic strain of 1.0%. Values given later are values determined in the same manner.

The entire base layer Lb is made of a foam rubber whose rate of foaming is preferably within a range of 5% to 50%, more preferably 10% to 40%. The rate of foaming used herein is defined by an expression $[\{(\rho_o - \rho_s)/(\rho_i - \rho_s)\} - 1] \times 100$ (%), where $\rho_o$ (g/cm$^3$) is a density of the foam rubber at a solid phase, $\rho_s$ (g/cm$^3$) is a density of a gas in voids of the foam rubber, and $\rho_i$ (g/cm$^3$) is a density of the foam rubber.

The maximum width w of the base layer Lb is preferably at least equal to the width TW of the tread 2. The percentage by volume of the base layer Lb to the whole tread is preferably 20% to 70%, more preferably 25% to 65%.

The inventors conducted various experiments with respect to tires each having a tread composed of two layers, or cap and base layers, and investigated effects of physical properties such as the dynamic storage modulus (E'c) and the loss tangent (tan $\delta$c) of the rubber of the cap layer and the dynamic storage modulus (E'b) of the rubber of the base layer upon passing noise, acceleration noise and wearing of the tread.

According to experimental results, when the rubber of the cap layer had a high dynamic storage modulus and a high loss tangent, acceleration noise was fully reduced and good wearing resistance was exhibited, whereas passing noise was not fully reduced. On the other hand, when the rubber of the cap layer had a high dynamic storage modulus and a low loss tangent, good wearing resistance was exhibited, whereas passing noise and acceleration noise were not fully reduced. Further, when the rubber of the cap layer had a low dynamic storage modulus and a high loss tangent, passing noise and acceleration noise were fully reduced, whereas wearing resistance was poor. On the other hand, when the rubber of the cap layer had a low dynamic storage modulus and a low loss tangent, passing noise was fully reduced, whereas acceleration noise was not fully reduced and wearing resistance was poor. Furthermore, when the rubber of the base layer had a high dynamic storage modulus, acceleration noise was fully reduced and good wearing resistance was exhibited, whereas passing noise was not fully reduced. On the other hand, when the rubber of the base layer had a low dynamic storage modulus, passing noise was fully reduced, whereas acceleration noise was not fully reduced and wearing resistance was poor.

The inventors of the present invention reviewed those experimental results, and arrived at a conclusion that with the combination of the rubber layers shown in Table 1, it is impossible that while the wear-resistance is kept, both the passing noise and the acceleration noise are simultaneously reduced.

In the present invention, it is a major premise to maintain high wear-resistance for the tire as described above. For this end, it is seen from the above experimental results that the dynamic storage moduli of the rubbers of both the cap and base layers are kept at higher values than certain values. However, when the dynamic storage moduli of both of the layers is higher, the level of the passing noise becomes higher, which makes it impossible to accomplish the object of the invention.

In order to accomplish the object of the invention, wear-resistance is ensured by setting the dynamic storage modulus (E'c) of the rubber of the cap layer at a high value, also setting the loss tangent (tan $\delta$c) of the rubber at a somewhat higher level, and further setting the dynamic storage modulus (E'b) of the rubber of the base layer to a value somewhat higher than that E'c of the cap layer to be coupled with the base layer, whereas the base layer is made of a foam rubber whose voids are dispersed. Thereby, the problem of high drift noise is solved. In other words, although the rubber of the base layer has a high dynamic storage modulus, vibration energy or noise energy can be considerably reduced by absorbing, in the voids of the base layer, the vibration energy generated in the tread rubber when the tire rolls.

Thus, the tire according to the invention can lower the passing noise as well as the acceleration noise, and can maintain or improve the wear-resistance of the tread of the tire.

The dynamic storage modulus (E'c) of the rubber of the cap layer is specified to be not less than $1.0 \times 10^8$ dyn/cm$^2$ and not more than $2.0 \times 10^8$ dyn/cm$^2$ according to the invention. This is because if the (E'c) is less than $1.0 \times 10^8$ dyn/cm$^2$, the required wear-resistance can not be obtained, and if the (E'c) is more than $2.0 \times 10^8$ dyn/cm$^2$, the passing noise exceeds an expected level. Preferably, $1.05 \times 10^8 \leq E'c \leq 1.90 \times 10^8$ dyn/cm$^2$, $0.16 \leq \tan \delta c \leq 0.33$, and $1.25 \times 10^8 \leq E'b \leq 2.10 \times 10^8$ dyn/cm$^2$.

Moreover, the loss tangent (tan $\delta$c) of the rubber of the cap layer is specified to be not less than 0.15 and not more than 0.35 according to the invention. This is because if the (tan δc) is less than 0.15, the acceleration noise becomes greater, and if the (tan δc) exceeds 0.35, an amount of heat generated in the tread increases to lower the heat separation-resistance of the tread.

On the other hand, the dynamic storage modulus (E'b) of the rubber of the base layer is specified to be not less than $1.2\times10^8$ dyn/cm$^2$ and not more than $2.2\times10^8$ dyn/cm$^2$ according to the invention. This is because if the (E'b) is less than $1.2\times10^8$ dyn/cm$^2$, the acceleration noise becomes great. If the (E'b) is more than $2.2\times10^8$ dyn/cm$^2$, the passing noise exceeds an expected level even if the foam rubber specified in the present invention is used.

Furthermore, the rate of foaming of the foam rubber for the base layer is specified to be not less than 5% and not more than 50% according to the invention. This is because if the rate of foaming is less than 5%, it cannot sufficiently absorb vibration energy which would be emitted outside as noise so that the passing noise may not be reduced to the desired level. If the rate of foaming is more than 50%, the wear-resistance is lowered, which makes it impossible to accomplish the object of the invention.

In addition, the maximum width w of the base layer made of the foam rubber is at least equal to the width TW of the tread. If the width of the base layer is less than TW, the noise-decreasing effect is reduced and the expected low noise level cannot be obtained. Moreover, the percentage by volume of the base layer to the whole tread is 20% to 70%. If it is less than 20%, absorption of the noise energy becomes insufficient. If it is more than 70%, the expected wear service life cannot be obtained due to exposed foam rubber in spite of remaining tread grooves having depths enough to allow the use of the tire.

Fundamental constructions in a width direction of actually manufactured tires of Examples 1 and 2 according to the invention will now be explained by referring again to FIG. 1. The tires of both the Examples have a tire size of 10.00R20 for trucks and buses, and the fundamental construction is the same except the rubbers of cap and base layers of the tread.

The low noise level tire 1 shown in FIG. 1 includes a radial carcass 3 of one ply reinforced by steel cords and toroidally extending between a pair of bead cores 6 (only one shown in FIG. 1) and a belt 4 of three layers reinforced by steel cords and arranged radially outwardly of the radial carcass 3. A stiffener rubber 7 and a chafer 8 are arranged as a reinforcement at each of the bead portions. A side rubber layer 5 extends radially inwardly from each of the width ends of the tread 2 to one bead portion. The steel cords of at least adjacent two layers of the belt 4 including three layers preferably intersect each other, and the steel cords are preferably inclined at angles within the range of 20° to 40° relative to an equatorial plane X—X of the tire. (The inclined angles are 30° in these examples.)

The tread 2 is formed by rubbers of an outer cap layer Lc and an inner base layer Lb. The width TW of the tread was 195 mm, while the width w of the base layer was 230 mm. When the tire 1 was mounted on a normal rim and inflated with a standard internal pressure, the radius of the tread was 550 mm.

Table 1 shows recipes, dynamic storage moduli (E') and loss tangents (tan δ) of the rubbers used in the respective layers of the treads of Examples, Conventional Example (Prior art), and Comparative Examples. The figures in the recipe are parts by weight of the respective components with respect to 100 parts by weight of the rubber. The (E') and (tan δ) were measured under the above-mentioned conditions by means of the measuring instrument described above. Each of test rubber pieces was 20 mm in length, 5 mm in width and 2 mm in thickness. The construction, materials and various dimensions of the tires of Conventional Example and Comparative Examples were substantially the same as those of Examples except the recipe of the rubber and the construction of the tread.

TABLE 1

| Recipe | A | B | C | D | E | F | J | H |
|---|---|---|---|---|---|---|---|---|
| Natural rubber | 100 | 100 | 100 | 90 | 100 | 70 | 70 | 70 |
| Styrene-butadiene rubber | — | — | — | 10 | — | — | — | — |
| Polybutadiene rubber | — | — | — | — | — | 30 | 30 | 30 |
| Carbon black | 50 | 40 | 60 | 55 | 68 | 40 | 55 | 55 |
| Process oil | — | — | — | 10 | — | — | — | — |
| Stearic acid | 2 | 2 | 2 | 2 | 2 | 2 | 2 | 2 |
| Antioxidant | 1 | 1 | 1 | 1 | 1 | 1 | 1 | 1 |
| Zinc white | 3 | 3 | 3 | 3 | 3 | 3 | 3 | 3 |
| Vulcanizing accelerator | 1.0 | 1.0 | 1.0 | 1.0 | 1.0 | 0.6 | 0.6 | 0.6 |
| Sulfur | 1.5 | 1.5 | 1.5 | 1.5 | 1.5 | 1.5 | 1.5 | 1.5 |
| (Foaming agent) | | | | | | | | |
| Dinitrosopentamethylene-tetramine | — | — | — | — | — | 3.0 | 3.0 | 1.0 |
| Urea | — | — | — | — | — | 3.0 | 3.0 | 1.0 |
| Rate of foaming | — | — | — | — | — | 20.3 | 19.4 | 3.8 |
| E' ($\times 10^3$ dyn/cm$^2$) | 1.23 | 0.65 | 1.70 | 1.10 | 2.21 | 0.85 | 1.75 | 1.80 |
| tan δ | 0.20 | 0.10 | 0.26 | 0.32 | 0.36 | 0.15 | 0.25 | 0.26 |

Tires of Examples, Conventional Example and Comparative Examples were manufactured by using the rubbers having the recipes in Table 1 as shown in Table 2.

TABLE 2

| | Example | | Prior art | Comparative example | | | | | | |
|---|---|---|---|---|---|---|---|---|---|---|
| | 1 | 2 | | 1 | 2 | 3 | 4 | 5 | 6 | 7 |
| (Example of blending) | | | | | | | | | | |
| Cap layer | C | A | A | B | C | D | E | A | B | A |
| Base layer | J | J | — | — | — | — | — | F | J | H |

With the tires of Conventional Example and Comparative Examples 1 to 4, the tread was made of a cap rubber layer only.

The tires of each of Examples, Conventional Example and Comparative Examples were equipped on a large-sized vehicle having one front axle and two rear axles, only one of which was driven. Two kinds of noise levels, that is to say, passing noise and acceleration noise were measured by the following estimation method. The tire was assembled onto a normal rim of 700 T×20, and filled with a normal pneumatic pressure of 7.25 kgf/cm². Two tires were fitted to the front axle, and four tires were fitted to each of the two rear axles. Thus, a total of ten tires were used in the vehicle for the test for one kind of the tires.

For measuring the passing noise, three microphones were fixedly arranged at positions spaced approximately 30 cm from the tread of the tire on the driving axle of the vehicle. When the vehicle was running at 40 km/h, the engine of the vehicle was stopped and noise was measured as passing noise immediately after the stoppage of the engine. The passing noise level was expressed by dB (A), and the average value of the measured values at three locations was used. The smaller the value, the better is the result.

For measuring acceleration noise, the same vehicle with the same number of the tires was used as in the measurement of the passing noise. Microphones were used in the same number and the same set positions as in the measuring of the passing noise. The vehicle was running at 40 km/h, and a torque of 300 kgf·m was applied to the tires. At that time, the noise was measured as acceleration noise. The acceleration noise level was also expressed by dB (A), and the average value of measured levels at three locations used as in the passing noise. The smaller value, the better is the result. These measured values of the acceleration noise are shown in Table 4 together with those of the passing noise.

For estimating the wear-resistance of the tires, each of the tires of Examples, Conventional Example and Comparative Examples was mounted on a normal rim of a vehicle and filled with the standard internal pressure, in the same manner as described above. After the vehicle had been driven about 40,000 km on general roads, depths of remaining grooves in the tread were measured. A traveled distance per 1 mm of a worn-off depth of a groove was calculated, and was taken as an index value representative of the wear resistance. Assuming that the value of the tires of the prior art was 100, values obtained were expressed by index of wear resistance. These index numbers are shown in Table 3. The larger value, the better is the result.

acceleration noise to the tires of Comparative Examples 1, 3, 5 and 6. Moreover, the tire of Comparative Example 3 exhibits the levels of the passing and acceleration noise near to those of the tires of Example 1, but is considerably inferior in terms of the wear resistance to the tire of Example 1 and even the tire of Prior Art. Therefore, the tire of Comparative Examples 3 is undesirable.

The tires of Examples 1 and 2 are pneumatic radial tires having steel cords as reinforcing members. However, the present invention is applicable to a tire whose belt and/or carcass is reinforced by organic or inorganic fiber cords. Moreover, the present invention is not limited to the radial carcass tire, but can bring about the same effect by applying it to a bias tire having organic or inorganic fiber cords.

It is further understood by those skilled in the art that the foregoing description is that of preferred embodiments of the disclosed tires and that various changes and modifications may be made in the invention without departing from the scope of the claims.

What is claimed is:

1. A low noise level truck and bus tire including; a carcass composed of at least one ply toroidally extending between a pair of bead cores, and a tread arranged radially outwardly of said carcass and composed on an outer cap rubber layer and an inner base rubber layer, wherein the cap rubber layer is made of a rubber having a dynamic storage modulus (E'c) of not less than $1.0 \times 10^8$ dyn/cm² and not more than $2.0 \times 10^8$ dyn/cm² and a loss tangent of not less than 0.15 and not more than 0.35, and the base rubber layer is made of a rubber having a dynamic storage modulus (E'b) of not less than $1.2 \times 10^8$ dyn/cm² and not more than $2.2 \times 10^8$ dyn/cm² and a rate of foaming of not less than 5% and not more than 50%, wherein said dynamic storage modulus (E'b) is greater than said dynamic storage modulus (E'c) and the values of dynamic storage modulus and loss tangent are determined by use of a viscoelastic spectrometer operated at an atmospheric temperature of 25° C., a frequency of 52 Hz, an initial strain of 5% and dynamic strain of 1.0%.

2. The truck and bus tire according to claim 1, wherein the maximum width of the base rubber layer in its width direction is at least equal to the entire width of the tread of the tire.

3. The truck and bus tire according to claim 1, wherein the rate of foaming of the base rubber layer is not less than 10% and not more than 40%.

TABLE 3

|  | Example | | Prior art | Comparative example | | | | | | |
|---|---|---|---|---|---|---|---|---|---|---|
|  | 1 | 2 |  | 1 | 2 | 3 | 4 | 5 | 6 | 7 |
| Passing noise | 83.7 | 81.9 | 84.0 | 81.9 | 85.8 | 82.8 | 86.9 | 83.1 | 82.5 | 85.2 |
| Acceleration noise | 87.6 | 88.6 | 90.0 | 92.3 | 87.9 | 87.3 | 87.3 | 91.5 | 91.8 | 88.9 |
| Wear resistance | 115 | 104 | 100 | 75 | 118 | 95 | 123 | 98 | 78 | 105 |

As can be seen from Table 3, the tires of Examples 1 and 2 exhibit lower levels of both the passing and acceleration noises, and particularly significant effect upon the acceleration noise, in comparison with the tire of the prior art. In addition, it should be noticed that the wear resistance of the tires of Examples 1 and 2 are greatly improved.

Moreover, the tires of Examples 1 and 2 have splendid results in all-round performances of the passing and acceleration noise and wear-resistance in comparison with Comparative Examples. Additionally, the tire of Example 1 is inferior in terms of passing noise but superior in terms of the 4. The truck and bus tire according to claim 1, wherein a percentage by volume of the base rubber layer to the whole tread is 20% to 70%.

5. The truck and bus tire according to claim 4, wherein the percentage by volume of the base rubber layer to the whole tread is 25% to 65%.

6. The truck and bus tire according to claim 1, wherein the dynamic storage modulus of the cap rubber layer is not less than $1.05 \times 10^8$ dyn/cm² but not more than $1.90 \times 10^8$ dyn/cm².

7. The truck and bus tire according to claim 1, wherein the dynamic storage modulus of the base rubber layer is not less than $1.25 \times 10^8$ dyn/cm$^2$ but not more than $2.10 \times 10^8$ dyn/cm$^2$.

8. The truck and bus tire according to claim 1, wherein the loss tangent of the cap rubber layer is not less than 0.16 but not more than 0.33.

* * * * *